US012556914B2

(12) United States Patent
Vijaya Kumar et al.

(10) Patent No.: US 12,556,914 B2
(45) Date of Patent: Feb. 17, 2026

(54) ENHANCED USER EQUIPMENT SECURITY AGAINST ATTACKS IN A 4G OR 5G NETWORK

(71) Applicant: APPLE INC., Cupertino, CA (US)

(72) Inventors: Anikethan Ramakrishna Vijaya Kumar, Mysuru (IN); Huarui Liang, Beijing (CN); Nirlesh Koshta, Bangalore (IN); Shu Guo, Beijing (CN); Sridhar Prakasam, Fremont, CA (US)

(73) Assignee: Apple Inc., Cupertino, CA (US)

( * ) Notice: Subject to any disclaimer, the term of this patent is extended or adjusted under 35 U.S.C. 154(b) by 188 days.

(21) Appl. No.: 17/885,469

(22) Filed: Aug. 10, 2022

(65) Prior Publication Data

US 2023/0064165 A1    Mar. 2, 2023

Related U.S. Application Data

(62) Division of application No. 17/855,760, filed on Jun. 30, 2022.

(30) Foreign Application Priority Data

Aug. 5, 2021  (IN) .............................. 202141035247

(51) Int. Cl.
*H04W 12/06*   (2021.01)
*H04L 9/40*    (2022.01)
*H04W 12/122*  (2021.01)
*H04W 12/71*   (2021.01)
*H04W 28/06*   (2009.01)

(52) U.S. Cl.
CPC ......... *H04W 12/06* (2013.01); *H04W 12/122* (2021.01); *H04W 12/71* (2021.01); *H04W 28/06* (2013.01)

(58) Field of Classification Search
CPC ..................................................... H04W 12/06
USPC .............................................................. 726/2
See application file for complete search history.

(56) References Cited

U.S. PATENT DOCUMENTS

| | | | |
|---|---|---|---|
| 11,310,731 B1 * | 4/2022 | Feder | H04W 36/32 |
| 2020/0229263 A1 * | 7/2020 | Rajadurai | H04W 12/06 |
| 2020/0275268 A1 * | 8/2020 | Pan | H04L 9/32 |
| 2021/0051577 A1 * | 2/2021 | Won | H04W 76/18 |
| 2021/0306972 A1 * | 9/2021 | Watfa | H04W 60/04 |
| 2023/0065637 A1 | 3/2023 | Kumar et al. | |

(Continued)

FOREIGN PATENT DOCUMENTS

CN    110536301 A   * 12/2019

OTHER PUBLICATIONS

Altaf Shaik; New vulnerabilities in 4G and 5G cellular access network New vulnerabilities in 4G and 5G cellular access network protocols : exposing device capabilities; ACM:year:2019; pp. 221-232.*

(Continued)

*Primary Examiner* — Monjur Rahim
(74) *Attorney, Agent, or Firm* — Kubota & Basol LLP

(57) ABSTRACT

A UE may receive a first GUTI from a network. The UE may transition to a Connected mode in response to a paging procedure with the network. The UE may take actions to ensure that a second GUTI is obtained from the network. Other aspects are described.

20 Claims, 12 Drawing Sheets

(56) References Cited

U.S. PATENT DOCUMENTS

2024/0056947 A1    2/2024    Watfa et al.
2024/0137764 A1*  4/2024    Guo .................... H04W 12/106

OTHER PUBLICATIONS

Extended European Search Report on the Patentability of Application No. 22190640.7 Mailed Nov. 16, 2022, 11 pages.
Vodafone et al: "Correction of handling the NAS reject messages without Integrity protection", 3GPP Draft; CI-153657-WAS3381-REL13, 3rd Generation Partnership Project (3GPP), Oct. 12, 2015 (Oct. 12, 2015), 3 pages.
Vodafone et al: "Correction of handling NAS reject messages without Integrity protection" , 3GPP Draft; CI-154088, 3rd Generation Partnership Project (3GPP), Nov. 16, 2015 (Nov. 16, 2015), 8 pages.
Apple: "Actions on T3247 expiry for other supported RATs", 3GPP Draft; CP-210133, 3rd Generation Partnership Project (3GPP), Mar. 2, 2021 (Mar. 22, 2021), 15 pages.
Apple: "Timer related actions upon receiption of Authentication Reject", 3GPP Draft; CI-210803, 3rd Generation Partnership Project (3GPP), Feb. 18, 2021 (Feb. 18, 2021), 15 pages.
Extended European Search Report on the Patentability of Application No. 22183232.2 Mailed Dec. 7, 2022, 14 pages.
Examination Report received for Indian Patent Application No. 202242046825, mailed on Oct. 31, 2023, 7 pages.
Request for the Submission of an Opinion received for Korean Patent Application No. 10-2022-0097306, mailed on Mar. 13, 2024, 6 pages (3 pages of English Translation and 3 pages of Original Document).
Non-Final Office Action received for U.S. Appl. No. 17/855,760, mailed on Jul. 15, 2024, 11 pages.
Final Office Action received for U.S. Appl. No. 17/855,760, mailed on Jan. 7, 2025, 11 pages.
Search Report received for Chinese Patent Application No. 202210997155.1, mailed on Mar. 31, 2025, 4 pages (2 pages of English Translation and 2 pages of Official Copy).
Search Report received for Chinese Patent Application No. 202210931221.5, mailed on Mar. 31, 2025, 5 pages (3 pages of English Translation and 2 pages of Official Copy).

* cited by examiner

ENHANCED USER EQUIPMENT SECURITY AGAINST ATTACKS IN A 4G OR 5G NETWORK

CROSS-REFERENCE

This application is a divisional of U.S. patent application Ser. No. 17/855,760 filed Jun. 30, 2022, which claims priority to Indian Patent Application No. 202141035247 filed Aug. 5, 2021, and the disclosure of which is hereby incorporated herein by reference in its entirety.

FIELD OF INVENTION

This invention relates generally to wireless technology and more particularly to enhanced user equipment (UE) security for a wireless network such as, for example, 4G or 5G.

BACKGROUND OF THE INVENTION

Fourth generation of broadband cellular network technology (4G) is a wireless standard that has a variety of applications such as, for example, mobile web access, telephony, gaming services, high-definition mobile TV, video conferencing, 3D television, and more. Fifth generation mobile network (5G) is a wireless standard that aims to improve upon data transmission speed, reliability, availability, and more. User equipment (UE) and a network may communicate various messages back and forth over 4G or 5G networks, which may open the UE to a malicious attack. Security can be enhanced.

SUMMARY OF THE DESCRIPTION

Aspects of the present disclosure relate to security enhancements for 4G and/or 5G new radio (NR).

In some aspects, a UE may discard a Plain Authentication Request message or a Plain Identity Request, when received in Service-Request-Initiated state. In such a manner, the UE will not respond to non-integrity protected Authentication Request message or non-integrity protected Identity Request message as part of integrity protected service request procedure (NR and LTE), tracking area update procedure (LTE), or registration request procedure (NR). Thus, a malicious attacker may not use a captured Authentication Request or an Identity Request message to track victim UEs in the network.

In some aspects, a UE may discard an Authentication Reject message from a 5G network, when an authentication procedure is not ongoing. Whether or not such a procedure is ongoing can be derived based on the last NAS message that the UE sent, such as, for example, an Authentication Response or an Authentication Failure message, and/or based on one or more timers at 5GMM/EMM that are currently active. In such a manner, the UE behavior can reduce potential loop holes in security that can be exploited by a rogue entity.

In some aspects, a UE may maintain a list of network authentication token (AUTN) and random value (RAND) pairs for which a Sync Failure has been declared by the UE. If an Authentication Request is received with an AUTN and RAND pair that is on the list, the UE can simply discard the message (e.g., without forwarding the message to the UE's SIM). In such a manner, an attacker network cannot use the same Authentication Request to keep tracking the UE at various times since the UE will not process the same AUTN and RAND if it has already declared a SYNC failure for the same.

In some aspects, a UE may remember that it has to receive a new GUTI when in Connected mode after the UE has transitioned to Connected mode as a response to paging. If this does not happen and if the UE ends up moving to Idle mode with the previous GUTI, then the UE may immediately trigger a mobility registration procedure to get a new GUTI re-allocated to the UE. In some aspects, the UE may start a short timer after entering Connected mode. If there is no GUTI reallocation before the expiry of "short timer", the UE may initiate Mobility Registration Update.

In some aspects, a network may send a GUTI Reallocation communication to a UE. The network may not receive a response from the UE (e.g., a GUTI Reallocation Complete) but the UE continues to stay in CONNECTED state. In response, the network may treat the use case as abnormal and release the NAS signalling connection with an indication for the UE to initiate registration procedure.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a device can perform operations to enhance security between a UE and a network as described. In the following description, numerous specific details are set forth to provide thorough explanation of aspects of the present invention. It will be apparent, however, to one skilled in the art, that aspects of the present invention may be practiced without these specific details. In other instances, well-known components, structures, and techniques have not been shown in detail in order not to obscure the understanding of this description.

Reference in the specification to "some aspects" or "an aspect" means that a particular feature, structure, or characteristic described in connection with the aspect can be included in at least one aspect of the invention. The appearances of the phrase "in some aspects" in various places in the specification do not necessarily all refer to the same aspect.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

In some aspects, the device is a user equipment (UE) device that has a wireless link with a base station. In some aspects, the device is a base station or a broadband processor of a base station. In some aspects, the wireless link is a third generation (3G), fourth generation (4G), or fifth generation (5G) link. The device further groups and selects component carriers (CCs) from the wireless link and determines a virtual CC from the group of selected CCs. The device additionally can perform a physical downlink resource mapping based on an aggregate resource matching patterns of groups of CCs.

Figure 1:
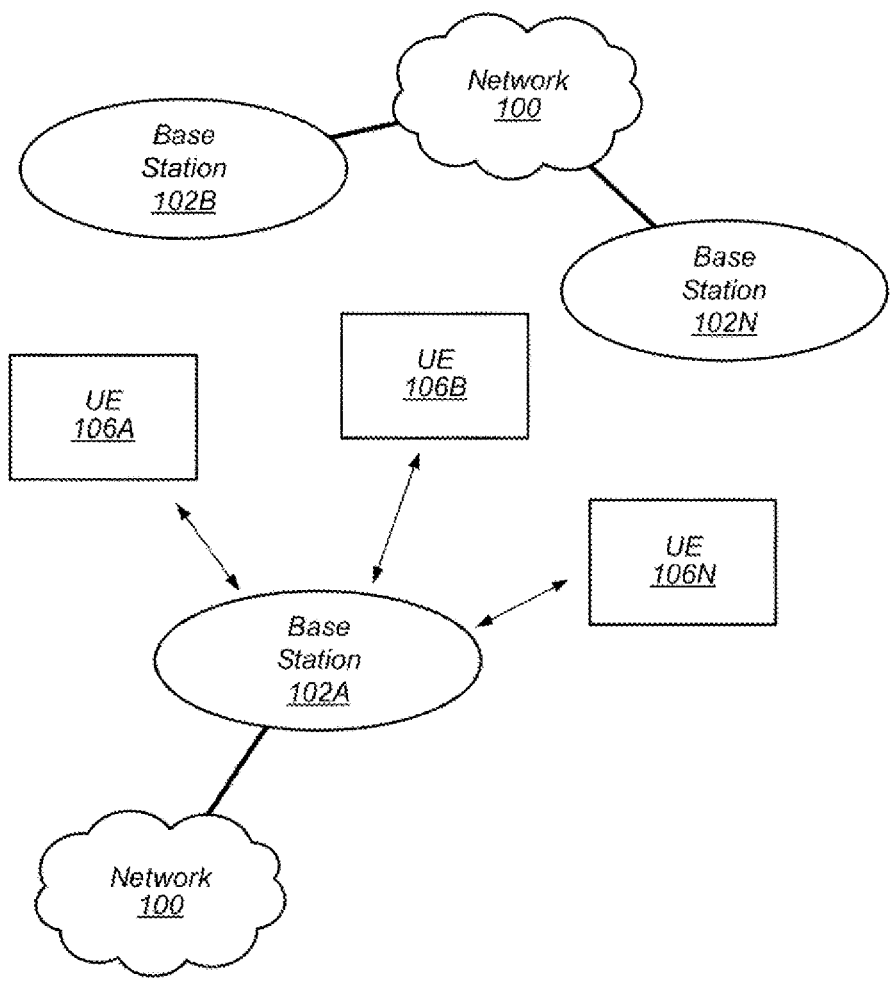
FIG. 1 illustrates an example wireless communication system according to some aspects.

FIG. 1 illustrates a simplified example wireless communication system, according to some aspects. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB". In some aspects, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

A network can include one or more base stations, one or more cells, hardware (e.g., a transceiver, a broadband processor, etc.), and software components (e.g., network entities) for supporting communication with a UE. A broadband processor can be configured to execute program instructions stored in memory to perform operations described.

Figure 2:
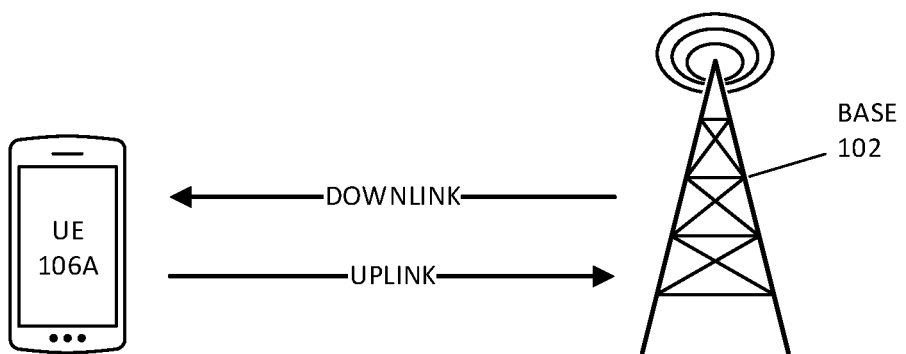
FIG. 2 illustrates uplink and downlink communications according to some aspects.

FIG. 2 illustrates UE 106A that can be in communication with a base station 102 through uplink and downlink communications, according to some aspects. The UEs may each be a device with cellular communication capability such as a mobile phone, a hand-held device, a computer or a tablet, or virtually any type of wireless device.

The UE may include a processor (e.g., a broadband processor) that is configured to execute program instructions stored in memory. The UE may perform any of the method aspects described herein by executing such stored instructions. Alternatively, or in addition, the UE may include a programmable hardware element such as an FPGA (field-programmable gate array) that is configured to perform any of the method aspects described herein, or any portion of any of the method aspects described herein.

The UE may include one or more antennas for communicating using one or more wireless communication protocols or technologies. In some aspects, the UE may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE may include separate transmit and/or receive chains (e.g., including separate antennas and other radio components) for each wireless communication protocol with which it is configured to communicate. As a further possibility, the UE may include one or more radios which are shared between multiple wireless communication protocols, and one or more radios which are used exclusively by a single wireless communication protocol. For example, the UE might include a shared radio for communicating using either of LTE or 5G NR (or LTE or 1xRTT or LTE or GSM), and separate radios for communicating using each of Wi-Fi and Bluetooth. Other configurations are also possible.

Figure 3:
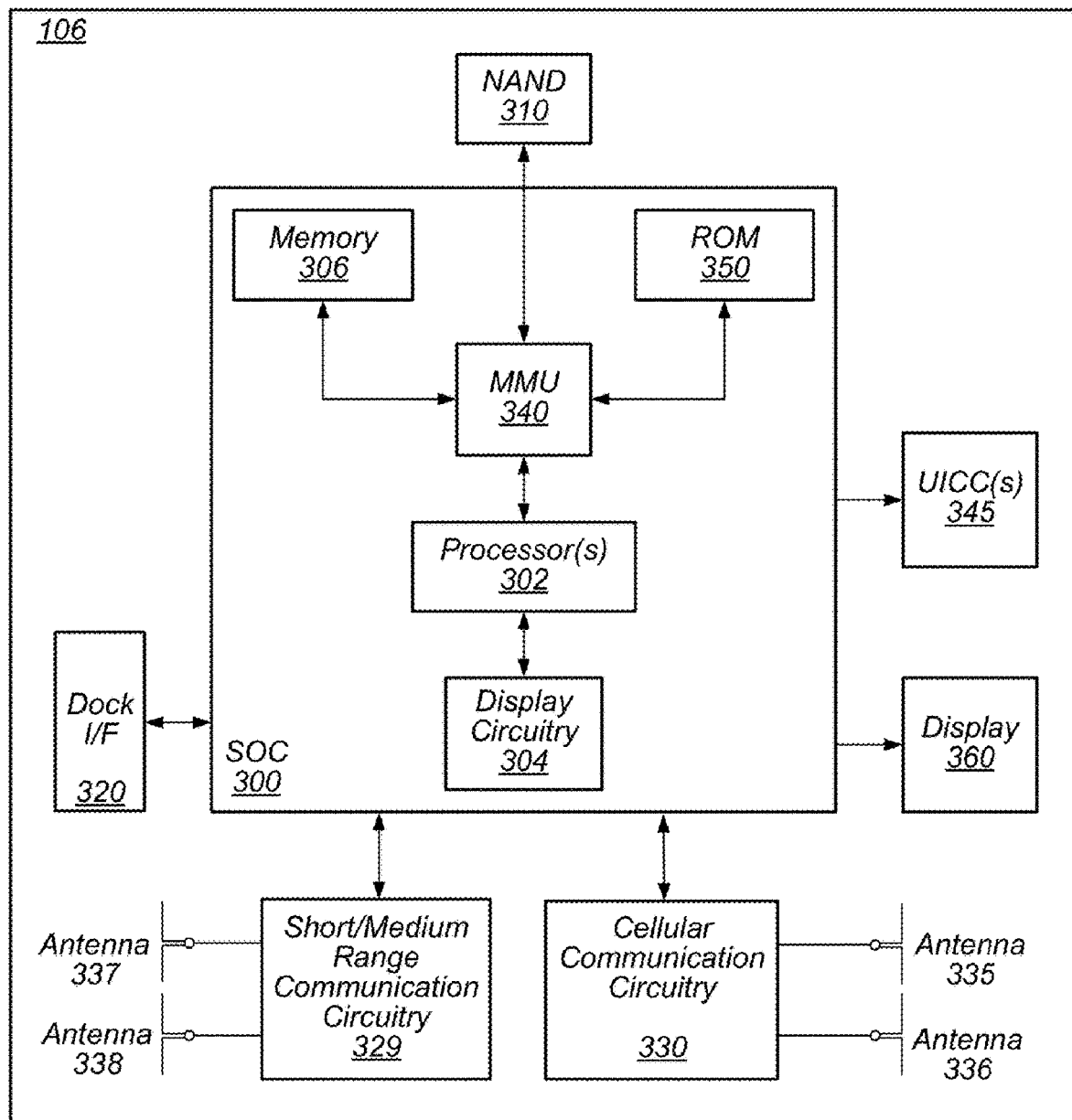
FIG. 3 illustrates an example block diagram of a UE according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a UE device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some aspects, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some aspects, as further described below, cellular communication circuitry 330 may include dedicated receive chains (including and/or coupled to, e.g., communicatively; directly or indirectly. dedicated processors and/or radios) for multiple radio access technologies (RAT s) (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively, (or in addition), processor 302 may be configured as a programmable hardware element, such as an FPGA (Field Programmable Gate Array), or as an ASIC (Application Specific Integrated Circuit). Alternatively, (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
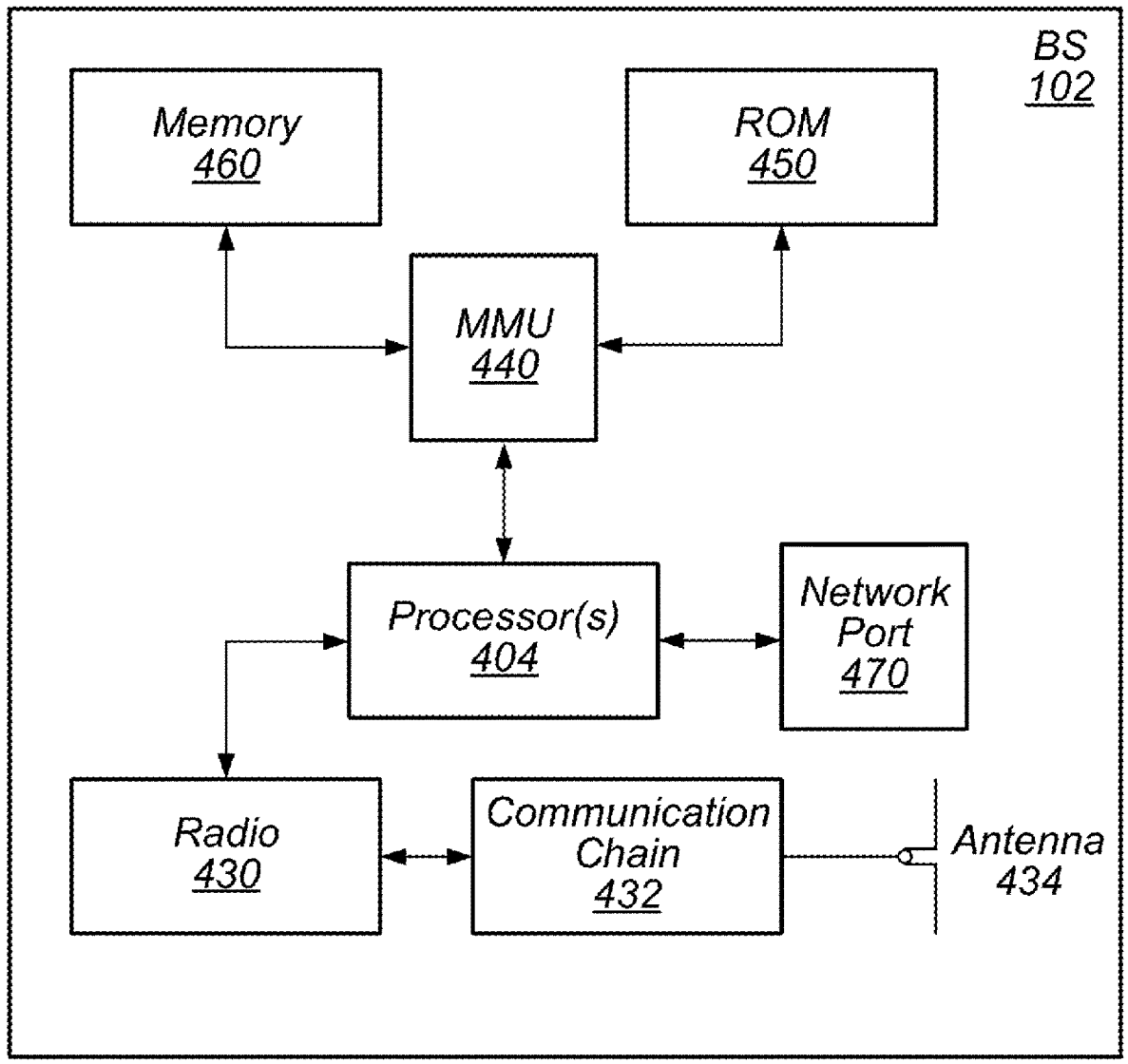
FIG. 4 illustrates an example block diagram of a BS according to some aspects.

FIG. 4 illustrates an example block diagram of a base station 102, according to some aspects. It is noted that the base station of FIG. 4 is merely one example of a possible base station. As shown, the base station 102 may include processor(s) 404 (which can include a broadband processor) which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB". In such aspects, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs. In some aspects, the base station can operate in 5G NR-U mode.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, 5G NR-U, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR and 5G NR-U. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively, (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
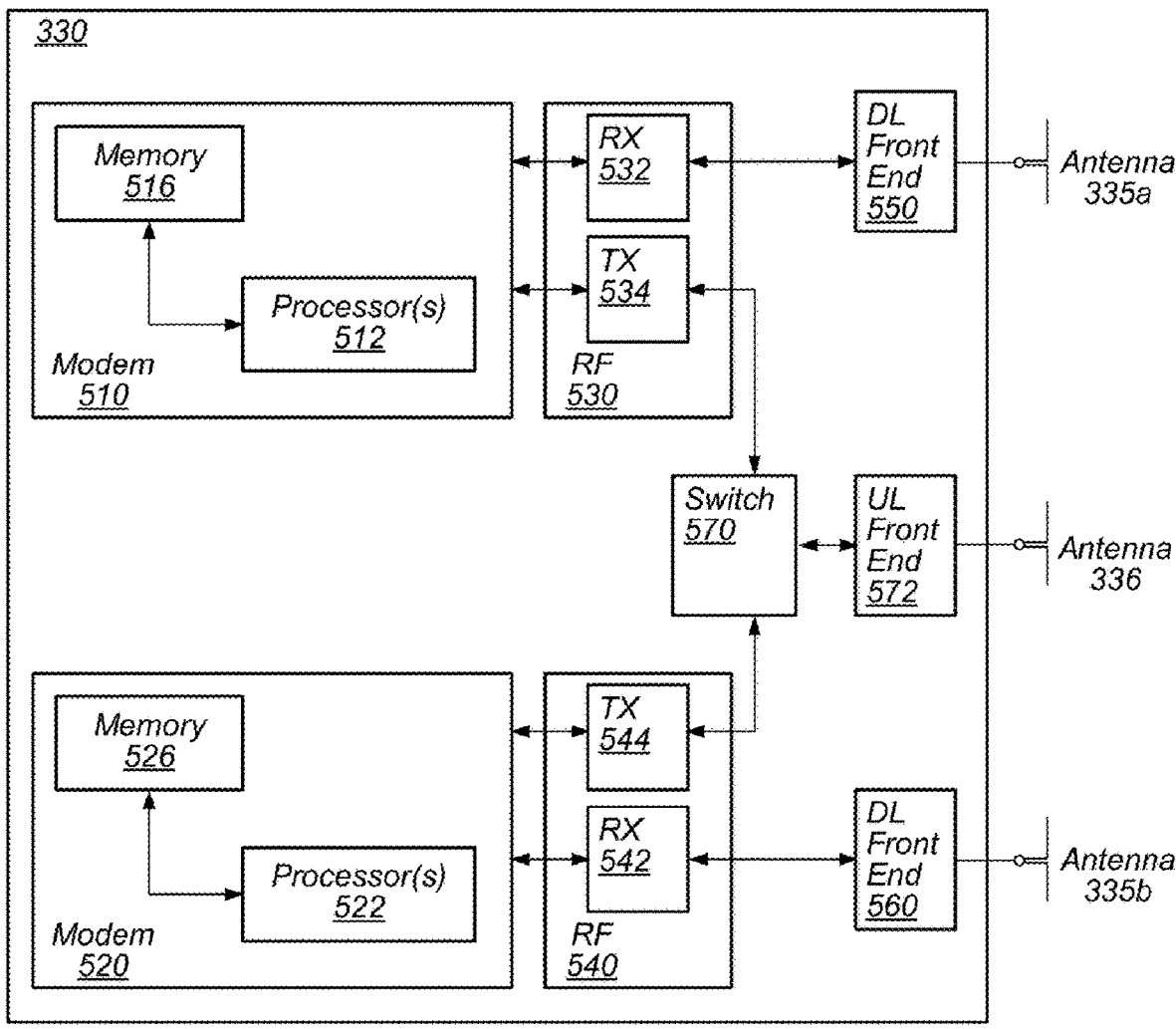
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit. According to aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some aspects, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for determining a physical downlink shared channel scheduling resource for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively, (or in addition), processor 512 may be configured as a programmable hardware element, such as an FPGA (Field Programmable Gate Array), or as an ASIC (Application Specific Integrated Circuit). Alternatively, (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for determining a physical downlink shared channel scheduling resource for a user equipment device and a base station, as well as the various other techniques described herein. The processors 522 may be configured to implement part or all of the features described herein, e.g., by executing program instructions stored on a memory medium (e.g., a non-transitory computer-readable memory medium). Alternatively, (or in addition), processor 522 may be configured as a programmable hardware element, such as an FPGA (Field Programmable Gate Array), or as an ASIC (Application Specific Integrated Circuit). Alternatively, (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Security issues may exist between a UE and network in live networks for 4G and 5G. Some issues are discussed in a paper titled "ProChecker: An Automated Security and Privacy Analysis Framework for 4G LTE Protocol Implementations", Karim et al. Security issues can involve a man in the middle (MiTM attack) that can steal or drop a message between the network and a UE. In some cases, a denial-of-service (DoS) attack may make seek to disrupt the UE resources or make it unavailable to the user. Attacks can have varying results, for example, an attacker may track a UE or cause a UE to behave in an undesirable manner. The UE and/or network can implement behavior to protect against some attack scenarios.

Figure 6:
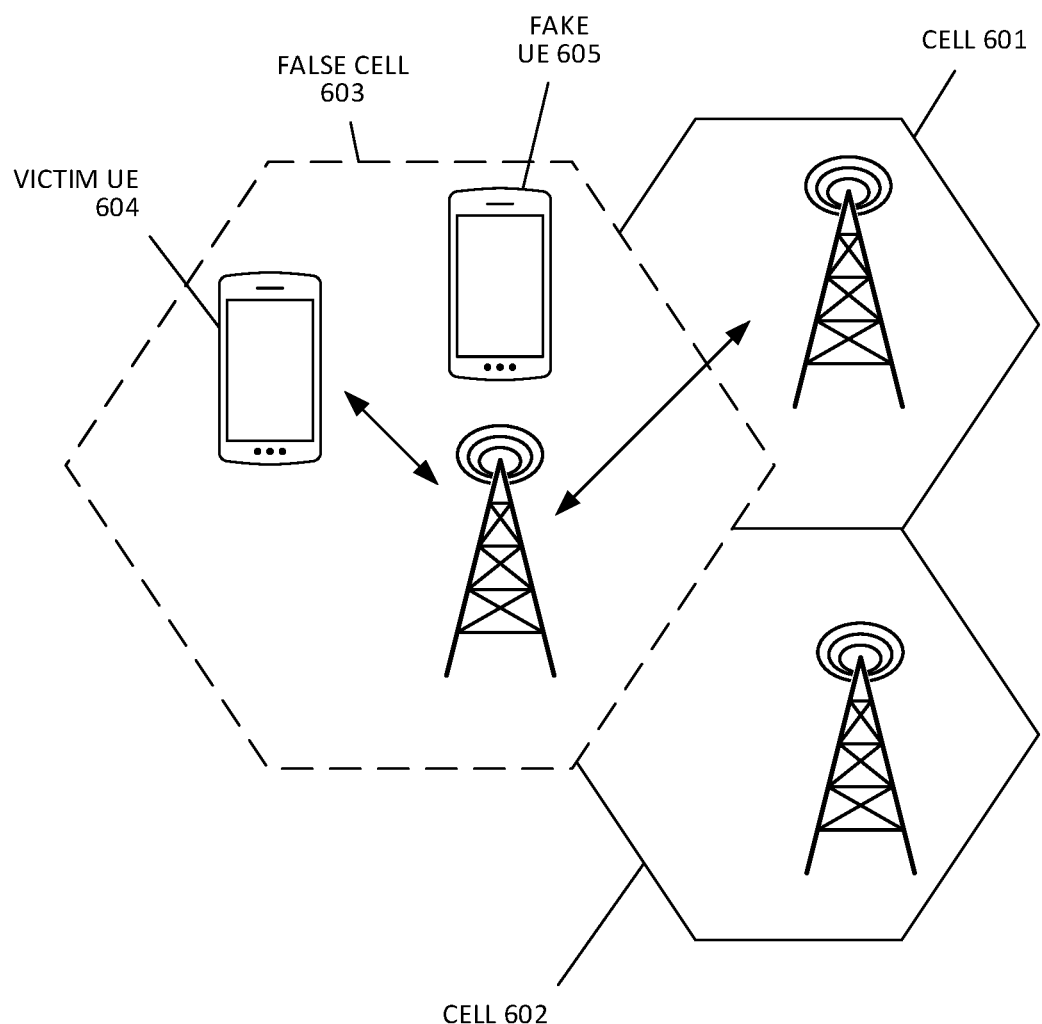
FIG. 6 illustrates a man in the middle (MiTM) attack scenario, according to some aspects.

FIG. 6 illustrates a man in the middle (MiTM) attack scenario, according to some aspects. A false cell 603 does not perform typical cell operations, rather it interjects itself into the network to attack the UE, thereby acting as a MiTM. For example, the false cell 603 can replay messages from a victim UE 604 to a genuine cell 601, while presenting itself to the victim UE as a genuine cell. The victim UE has trouble differentiating between the genuine cell 601 and the false cell 603. Mechanisms relating to detecting a MiTM such as those defined in TS 33.501 Annex E which are based on signal strength received by UE, neighboring cell information, and operating frequency of cell may not prevent such MiTM scenarios.

In some aspects, a scenario is identified where a fake UE 605 can capture an Authentication Request message sent by a genuine network (e.g., cell 601) for a UE 604. The fake UE 605 can forward this Authentication Request to a false cell 603 which can then transmit the same Authentication Request to one or more victim UEs 604 in false cell 603's coverage area. The victim UE 604 may respond with an Authentication Failure that indicates a cause as Synch Failure, or with an Authentication Response. It is only the victim UE 604 that can respond with a SYNCH Failure or Authentication Response and not any other victim UE. The fake cell can track the victim UE based on these specific responses.

To protect against such an attack, a UE may not be allowed to respond to non-integrity protected Authentication Request message as part of security protected service request procedure initiation under NR or LTE when in Service-Request-Initiated state and before secure connection has been established. Additionally, or alternatively, the UE may refrain from responding as part of a tracking area update procedure (LTE) or registration request procedure (NR).

In another scenario, an MiTM attack can be initiated towards a victim UE 604 where the false cell 603 selectively drops important messages that may be transmitted to the UE from a genuine cell (e.g., cell 601 or 602). For example, the false cell can selectively drop a GUTI Reallocation Command or a Configuration Update Command (CUC) after paging is performed by a genuine cell of the network for a mobile terminated session initiation.

A UE can implement various solutions to protect against such scenarios by detecting if a MiTM entity is filtering the CUC command after paging is received by it. In other words, the MiTM may pass all other messages from the genuine cell to the UE, but drop the GUTI reallocation commands selectively. Similarly, this solution can be extended to other messages which the UE is expected to receive from the network after initiation of a procedure.

In some scenarios, a false cell 603 can send an Authentication Reject message to a victim UE 604 without any integrity protection when Authentication procedure is not ongoing. Current UE behavior (e.g., as defined by the 3GPP specification) may not mandate UE to discard an Authentication Reject message when an Authentication procedure is not ongoing. As a result, a UE can receive and process an Authentication Reject message without integrity protection, consider the tracking area as forbidden if there is specific handling for non-integrity protected reject messages or possibly immediately invalidate the USIM if there is no specific handling for non-integrity protected reject messages.

If a threshold number of such Authentication Reject messages are received when UE is camped on different cells, the current UE behavior may consider the SIM to be invalid for CS and PS service. As such, the false cell may cause the UE to invalidate its SIM, which could require a user to reset the UE device.

Operations described in the present disclosure, which can be performed by a UE and/or network, can make the 4G or 5G ecosystem more secure from attackers. Such operations can help a UE identify a vulnerability and take proactive steps to mitigate unforeseen issues due to these vulnerabilities.

Currently, a UE may be allowed to handle a plain Authentication Request Message or a plain Identity Request message in EMM/5GMM state "Service-Request-Initiated". A genuine network, however, would not send a plain Authentication Request message or an Identity Request. The reason being that a UE that has initiated a Service Request procedure is expected to move to the Service-Request-Initiated state. A UE can initiate the Service Request procedure only if it is Registered in the current tracking area and has the update status set to Updated. Additionally, the Service Request includes S-TMSI as the identity. Therefore, it is appreciated that the network will have knowledge of the UE's context to be able to handle the UE's Service Request message.

If a UE receives and processes a plain Authentication Request or a plain Identity Request when the UE is in the Service-Request-Initiated state, this opens up the possibility of "user tracking attacks" whereby a UE could be paged and sent a previously captured Plain Authentication Request message to which only the particular UE in question would send a "Synch Failure" and every other UE would declare a MAC failure. Similarly, a rogue network could send a plain Identity Request Message querying UE for its permanent identity like IMSI or IMEI/IMEISV, thereby allowing UE(s) to be easily tracked. To protect against such behavior, a UE may discard a Plain Authentication Request message or Plain Identity Request Message, when received in Service-Request-Initiated state.

Figure 7:
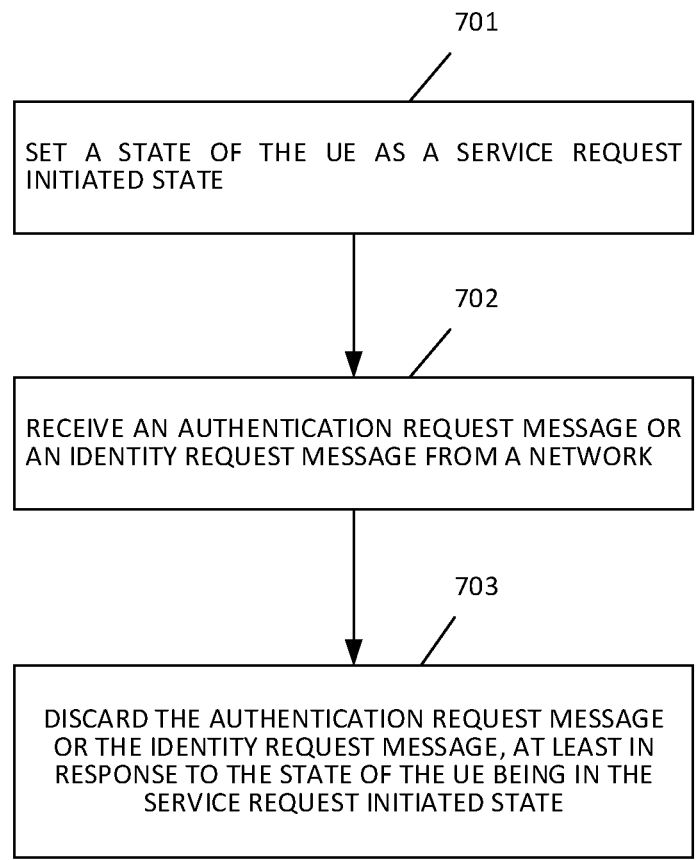
FIG. 7 illustrates a flow diagram for UE treatment of an authentication request in a service request state, according to some aspects.

FIG. 7 illustrates a flow diagram of a method 700 for UE treatment of an authentication request in a service request initiated state, according to some aspects. The method can be performed by a UE which can also be understood as being performed by a broadband processor of the UE.

This method, as well as others described in the present disclosure, can be performed in the context of a UE that communicates with a network in a 5G environment or in a 4G environment. In the case of 5G, the UE can communicate with the network using a Non-Access-Stratum (NAS) protocol for 5G system (5GS). In the case of 4G, the UE can communicate with the network using Non-Access-Stratum (NAS) protocol for Evolved Packet System (EPS).

NAS can be understood as a protocol or set of protocols that conveys non-radio signalling between the User Equipment (UE) and Core Nodes such as, for example, Mobility Management Entity (MME) in a 4G environment, or 5G Core Access and Mobility Management Function (AMF) in a 5G environment. NAS is a functional layer in wireless protocol stacks between the core network and user equipment that manages the establishment of communication sessions. NAS maintains continuous communications with the user equipment as it moves.

At block 701, a UE can set a state of the UE as a Service Request Initiated state. In a 5G environment, the UE state can be set as 5GMM-Service-Request-Initiated state. In a 4G environment, the UE state can be set as EMM-Service-Request-Initiated state. The state of the UE here can be understood as a Mobility Management state.

For example, in a 4G environment, the UE may transition between various EMM states, the main states being EMM-Registered and EMM-Deregistered. From EMM-Registered state, the UE can enter the EMM-Service-Request-Initiated-State after the UE has started the service request procedure. In the EMM-Service-Request-Initiated-State, the UE waits for a response from the network (e.g., from the Mobility Management Entity (MME)) such as a service accept, or service reject message. The EMM state machine can be further characterized by sub-section 5.1.3 of TS 24.301.

Similarly, in a 5G environment, the UE may transition between various 5GMM states, the main states being 5GMM-Registered and 5GMM-Deregistered. From the 5GMM-registered state, the UE can enter the 5GMM-Service-Request-Initiated-State after the UE has started the service request procedure. In this state, the UE waits for a response from the network (e.g., from the 5G Core Access and Mobility Management Function (AMF)) such as a service accept, or service reject message. The 5GMM State Machine can be further characterized by sub-section 5.1.3 of 3GPP TS 24.501.

As such, in either a 4G or 5G environment, the UE may set the state of the UE as the service request initiated state in response to the UE sending a service request message to the network (e.g., from the Registered state).

At block 702, the UE can receive an Authentication Request message or an Identity Request message from the network. As discussed, the UE may receive the Authentication Request message or the Identity Request message, and other messages from the network as defined by NAS protocol for 5GS or EPS. An Authentication Request message is sent by the network (e.g., AMF or MME) to the UE to initiate Authentication of the UE identity.

At block 703, the UE can discard the Authentication Request message or the Identity Request message, at least in response to the state of the UE being in the Service Request Initiated state. When the UE is in a different state other than the Service Request Initiated state, the UE may process the Authentication Request message or the Identity Request message or it may ignore it based on other logic.

In some aspects, the Authentication Request message or the Identity Request message is discarded by the baseband processor of the UE in response to the state of the UE being in the Service Request Initiated state, and the Authentication Request message or the Identity Request message not including integrity protection.

In 5G, integrity protection of the control plane (CP) can be present between the device and the MME/AMF and between the device and the eNB/gNB. Integrity protection ensures that the intruder cannot replay or modify signalling messages that the mobile and network exchange. It protects the system against problems such as man-in-middle attacks, in which an intruder intercepts a sequence of signalling messages and modifies and re transmits them, in an attempt to take control of the mobile. Thus, if the Authentication Request message includes integrity protection and if the integrity check passes, then the UE may handle the Authentication Request message because the message is assumed to be from a genuine cell. If, however, the Authentication Request message lacks integrity protection, and the UE is in the Service Request Initiated state, then the UE can drop the received message.

Similarly, the Authentication Request message or the Identity Request message may be discarded by the UE in response to the state of the UE being in the Service Request Initiated state and the Authentication Request message or the Identity Request message being a Plain message.

A Plain NAS message (e.g., a plain Authentication Request or Identity Request) has a header that includes neither a message authentication code nor a sequence number. Thus, the UE may drop such as message when it is in the Service Request Initiated state, to protect from possible attackers when in this state.

In such a manner, a UE may protect against an attacker that is paging a UE and trying to identify the UE based on the UE's response to a previously stored Plain Authentication Request.

Operations described above can be characterized by changes described in quotation marks below, in specification 3GPP TS 24.501, which states, in section 4.4.4.2, Integrity checking of NAS signalling messages in the UE:

Except the messages listed below, no NAS signalling messages shall be processed by the receiving 5GMM entity in the UE or forwarded to the 5GSM entity, unless the network has established secure exchange of 5GS NAS messages for the NAS signalling connection: a) IDENTITY REQUEST (if requested identification parameter is SUCI "and when not in 5GMM-SERVICE-REQUEST-INITIATED state"); b) AUTHENTICATION REQUEST "(when not in 5GMM-SERVICE-REQUEST-INITIATED state)";

Once the secure exchange of NAS messages has been established, the receiving 5GMM entity in the UE shall not process any NAS signalling messages unless they have been successfully integrity checked by the NAS. If NAS signalling messages, having not successfully passed the integrity check, are received, then the NAS in the UE shall discard that message. The processing of the SECURITY MODE COMMAND message that has not successfully passed the integrity check is specified in subclause 5.4.2.5. If any NAS signalling message is received as not integrity protected even though the secure exchange of NAS messages has been established by the network, then the NAS shall discard this message. "If AUTHENTICATION REQUEST message or the IDENTITY REQUEST message is received without integrity protection when in 5GMM-SERVICE-REQUEST-INITIATED sub-state the UE shall discard the message."

Similarly, operations described above can be characterized by changes described in quotation marks below, in specification 3GPP TS 24.301, which states, in 4.4.4.2 Integrity checking of NAS signalling messages in the UE:

Except the messages listed below, no NAS signalling messages shall be processed by the receiving EMM entity in the UE or forwarded to the ESM entity, unless the network has established secure exchange of NAS messages for the NAS signalling connection:

EMM messages:—IDENTITY REQUEST (if requested identification parameter is IMSI "and when not in EMM-SERVICE-REQUEST-INITIATED state");—AUTHENTICATION REQUEST "(when not in EMM-SERVICE-REQUEST-INITIATED state)";

Once the secure exchange of NAS messages has been established, the receiving EMM or ESM entity in the UE shall not process any NAS signalling messages unless they have been successfully integrity checked by the NAS. If NAS signalling messages, having not successfully passed the integrity check, are received, then the NAS in the UE shall discard that message. The processing of the SECURITY MODE COMMAND message that has not successfully passed the integrity check is specified in subclause 5.4.3.5. If any NAS signalling message is received as not integrity protected even though the secure exchange of NAS messages has been established by the network, then the NAS shall discard this message. "If AUTHENTICATION REQUEST message of IDENTITY REQUEST message is received without integrity protection when in EMM-SERVICE-REQUEST-INITIATED sub-state the UE shall discard the message."

Currently, a UE, as allowed by specification, ends up handling a standalone Authentication Reject message even when network has not started an Authentication procedure. This opens up the possibility that a rogue network entity can send standalone Authentication Reject (e.g., without integrity protection) and UE will handle it as Denial of Service (DoS) handling when authentication procedure is not ongoing.

In some aspects, to protect against such an issue, a UE may discard an Authentication Reject message, when Authentication procedure is not ongoing. Whether or not the Authentication procedure is ongoing can be determined based on the last NAS message that the UE sent (e.g., an Authentication Response/Authentication Failure message) or based on timers for 5GMM/EMM that are currently active. In such a manner, the UE may process Authentication Reject messages only when Authentication procedure is ongoing, thereby reducing potential loop holes in security that can be exploited by an attacker.

Figure 8:
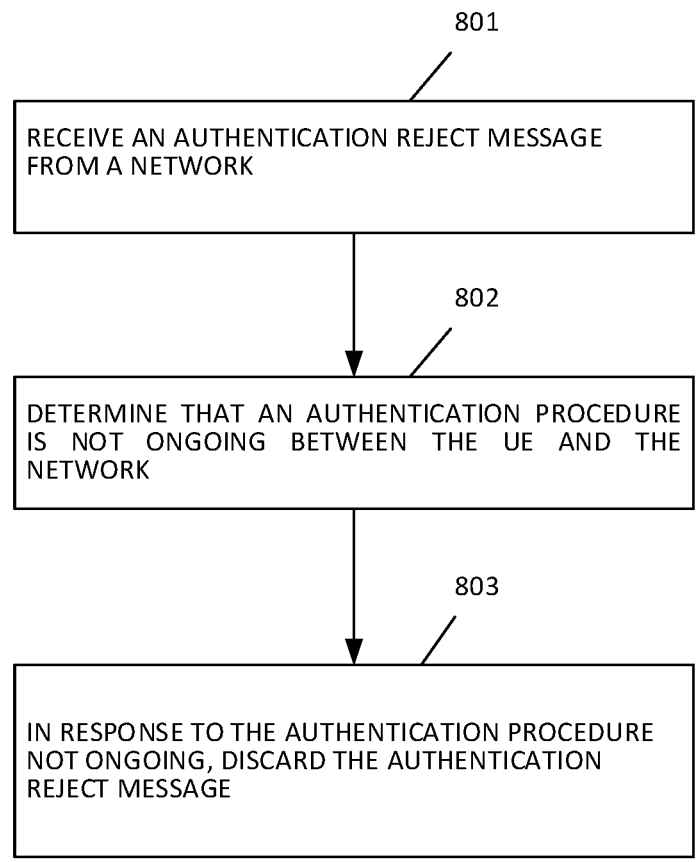
FIG. 8 illustrates a flow diagram for UE treatment of an authentication reject message, according to some aspects.

FIG. 8 illustrates a flow diagram of a method 800 for UE treatment of an Authentication Reject message, according to some aspects. The method can be performed by a UE which can also be understood as being performed by a broadband processor of the UE.

At block 801, the UE may receive an Authentication Reject message from a network. The Authentication Reject message may be sent to the UE from an AMF in a 5G network, or from an MME in a 4G network. An Authentication Reject message is a message sent from the network to the UE to indicate that an Authentication procedure has failed and that the UE shall abort all activities. An Authentication procedure includes a series of operations performed by a UE and network to provide mutual authentication between the UE and the network. Mutual authentication is the mechanism by which both the UE and the network verify each other as genuine. This may be done via the EPS AKA and 5G AKA in 4G and 5G respectively. FIG. 5.4.1.2.1.1: of 3GPP TS 24501 shows an example of an authentication procedure.

At block 802, the UE may determine that an authentication procedure is not ongoing between the UE and the network. The UE may use various criteria to determine that the authentication procedure is not ongoing.

In some examples, the UE can determine that the authentication procedure is not ongoing in response to when the UE has not sent, prior to receiving the Authentication Reject message, an Authentication Response message or an Authentication Failure message to the network. For example, if the most recent message that the UE sent to the network, prior to receiving the Authentication Reject message, is not an Authentication Response message or an Authentication Failure message, then this can indicate to the UE that the Authentication procedure is not ongoing, and that the network should not be sending an Authentication Reject message to the UE.

In some embodiments, the UE may determine that the Authentication procedure is not ongoing based on one or more timers. For example, in a 5G environment, the UE may determine that the Authentication procedure is not ongoing in response to a timer T3516 and a timer T3520 being inactive. A timer can be understood as active when it has been started and has not yet been stopped or expired. An active timer counts toward expiration or until it is stopped.

T3516 may be started by the UE when a RAND and result (RES) are stored as a result of a 5G authentication challenge. The timer T3516 can be stopped when one or more of the following occurs: SECURITY MODE COMMAND is received, SERVICE REJECT is received, REGISTRATION ACCEPT is received, AUTHENTICATION REJECT is received, AUTHENTICATION FAILURE is sent, when the UE enters a state of 5GMM-DEREGISTERED, 5GMM-NULL or 5GMM-IDLE.

T3520 may be started by the UE upon transmission of AUTHENTICATION FAILURE message with any of the 5GMM cause #20, #21, #26 or #71, or upon transmission of AUTHENTICATION RESPONSE message with an EAP-response message after detection of an error as described in subclause 5.4.1.2.2.4 of 3GPP TS 24501. T3520 may be stopped by the UE in response to receiving an AUTHENTICATION REQUEST message or AUTHENTICATION REJECT message, or for other reasons, as described in 3GPP TS 24501.

As such, if timer T3516 or T3520 are on, this may indicate that the Authentication procedure is ongoing. If not, then the UE may operate on the assumption that the Authentication procedure is not ongoing.

In a 4G environment, the UE may determine that the authentication procedure is not ongoing in response to timers T3416, T3418, and T3420 being inactive. T3416 may be started by the UE as a result of RAND and RES stored as a result of an EPS authentication challenge. It may be stopped, for example, when the UE receives an AUTHENTICATION REJECT or sends an AUTHENTICATION FAILURE, or other reasons stated in TS 24301. T3418 may be started when the UE sends an AUTHENTICATION FAILURE with EMM cause #20 or #26. The UE may stop T3418 receiving an AUTHENTICATION REQUEST received or AUTHENTICATION REJECT received, or other reasons stated in TS 24.301. T3420 may be started when the UE sends an AUTHENTICATION FAILURE with EMM cause #21. The UE may stop T3420 receiving an AUTHENTICATION REQUEST received or AUTHENTICATION REJECT received, or other reasons stated in TS 24.301.

In such a manner, the UE may determine that the Authentication procedure is ongoing based on the last NAS message that the UE sent (e.g., an Authentication Response or Authentication Failure message) and/or based on UE timers for 5GMM/EMM that are active.

At block 803, in response to the Authentication procedure not being ongoing, the UE can discard the authentication reject message. As such, the UE can identify standalone authentication reject messages that are sent to the UE from a malicious network entity and drop them, rather than handling them based on denial of service (DoS) handling.

In some aspects, a UE may start a timer T3247, in response to the authentication reject message not having integrity protection, and the UE having sent an authentication response message or authentication failure message to the network prior to receiving the authentication reject message. In some aspects, in response to the authentication reject message not having integrity protection, and at least one of timer T3416, T3418 and T3420 being active, the UE may start T3247. In some aspects, in response to the authentication reject message not having integrity protection, and at least one of timer T3516 and timer T3520 being active, the UE can start timer T3247. Upon expiry of T3247, the UE may perform actions described with respect to expiry of T3247 as described in 5.3.7b of TS 24.301.

In some aspects, in response to determining that the authentication procedure is ongoing between the UE and the network or if the authentication reject message has integrity protection, the UE may handle the authentication reject message.

In a 5G environment, the Authentication Reject message may be received by the UE as part of a Non-Access-Stratum (NAS) protocol for 5G system (5GS). In a 4G environment, the Authentication Reject message may be received as part of a Non-Access-Stratum (NAS) protocol for Evolved Packet System (EPS).

Some features described above can be characterized by changes described in quotation marks below, in specification 3GPP TS 24.501, which states, in section 5.4.1.3.6 Authentication not accepted by the UE: "m) Reception of authentication reject when no authentication procedure is ongoing UE shall discard any authentication reject message received from network when it has not sent a AUTHENTICATION RESPONSE or AUTHENTICATION FAILURE message to network" [or] "m) Reception of authentication reject when none of timers T3516, T3520 are running UE shall discard any authentication reject message received from network"

Similarly, some features described above can be characterized by changes described in quotation marks below, in specification 3GPP TS 24.301, which states, in section 5.4.2.7 Abnormal cases: "1) Reception of authentication reject when no authentication procedure is ongoing UE shall discard any authentication reject message received from network when it has not sent a AUTHENTICATION RESPONSE or AUTHENTICATION FAILURE message to network" [OR] "1) Reception of authentication reject when none of T3416, T3418 or T3420 are running UE shall discard any authentication reject message received from network."

Similarly, some features described above can be characterized by changes described in quotation marks below, in specification 3GPP TS 24.501, which states in section 5.4.1.3.5 Authentication not accepted by the network:
2) if the AUTHENTICATION REJECT message is received without integrity protection "and any of the timers T3516 or T3420 are running", the UE shall start timer T3247 with a random value uniformly drawn from the range between 30 minutes and 60 minutes, if the timer is not running (see subclause 5.3.20). [OR]
2) if the AUTHENTICATION REJECT message is received without integrity protection "and if the UE had previously sent an AUTHENTICATION RESPONSE or AUTHENTICATION FAILURE to the network", the UE shall start timer T3247 with a random value uniformly drawn from the range between 30 minutes and 60 minutes, if the timer is not running (see subclause 5.3.20).

Similarly, some features described above can be characterized by changes described in quotation marks below, in specification 3GPP TS 24.301, which states, in section 5.4.2.5 Authentication not accepted by the network:
Upon receipt of an AUTHENTICATION REJECT message, b) if the message is received without integrity protection "and any of the timers T3416, T3418 or T3420 are running", the UE shall start timer T3247 (see 3GPP TS 24.008 [13]) with a random value uniformly drawn from the range between 30 minutes and 60 minutes, if the timer is not running (see subclause 5.3.7b). [OR] b) if the message is received without integrity protection "and if the UE had previously sent an AUTHENTICATION RESPONSE or AUTHENTICATION FAILURE to the network", the UE shall start timer T3247 (see 3GPP TS 24.008 [13]) with a random value uniformly drawn from the range between 30 minutes and 60 minutes, if the timer is not running (see subclause 5.3.7b).

Some current UE behavior may have the UE declare a "Synch Failure" in an Authentication Failure message if the network uses an SQN which has already been used. The UE, in turn, may send the AUTS parameter to enable to the network to re-synchronize the SQN value.

Hence it is not expected for a genuine network to resend an AUTN for which Synch Failure has already been declared. But the current UE behavior does not factor a reuse of AUTN for which Synch Failure has already been declared thereby allowing an attacker to exploit this loophole. If a UE responds to each reused AUTN by declaring a Synch Failure, an attacker network can randomly, at various times, use the same Authentication Request to elicit a Synch Failure from the UE and thereby track the UE when needed.

In some aspects, a UE may maintain a list (e.g., an array of size 'N') of AUTN and RAND pairs for which Synch Failure has been declared. If an Authentication Request is received with the same AUTN and RAND again, the UE can simply discard the message without forwarding it to the SIM. In such a manner, an attacker network cannot use the same Authentication Request to track the UE at various times since the UE will not process the same AUTN and RAND if it has already declared a Synch Failure for the same.

Figure 9:
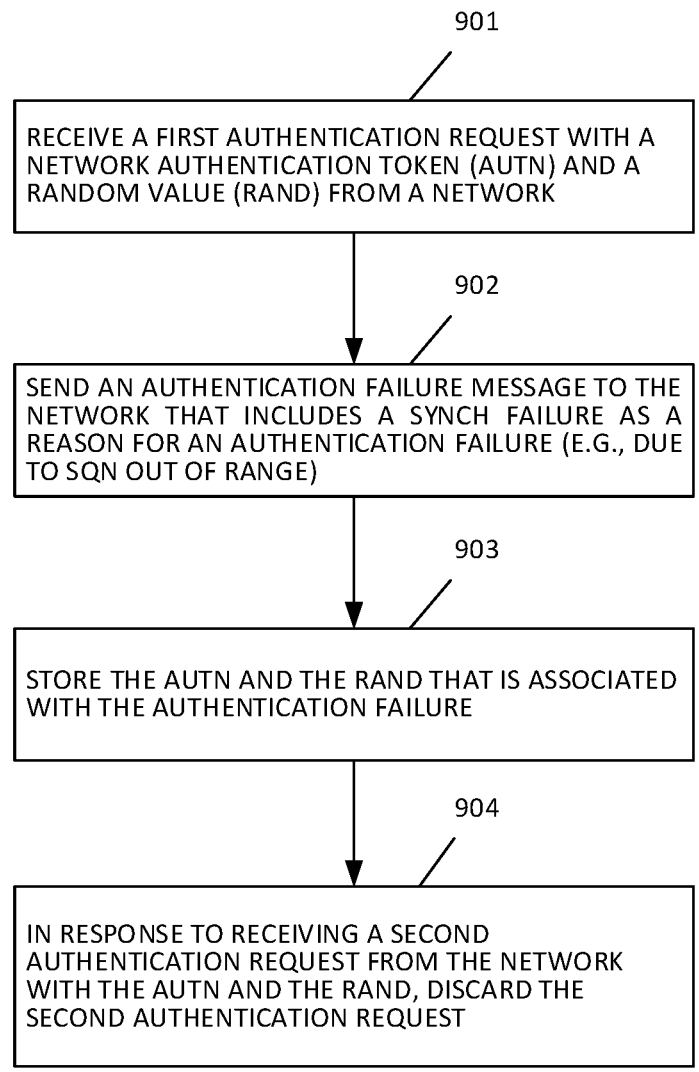
FIG. 9 illustrates a flow diagram for UE treatment of authentication request to protect against repeated synch failures, according to some aspects.

FIG. 9 illustrates a flow diagram for a method 900 relating to UE treatment of authentication request with recycled AUTN and RAND pairs, to protect against repeated synch failures, according to some aspects. The method 900 can be performed by a UE which can also be understood as being performed by a broadband processor of the UE. The method may include messages communicated between a UE and a network that are part of the NAS protocol for EPS or NAS protocol for 5GS.

At block 901, the UE may receive a first authentication request with a network authentication token (AUTN) and a random value (RAND) from a network. As described, an authentication request can be a message sent from the network (e.g., MME in a 4G environment or AMR in a 5G environment) to initiate an Authentication procedure for achieving mutual authentication. The Authentication procedure can use Authentication and Key Agreement (AKA) protocol and procedures that support entity authentication, message integrity, and message confidentiality, among other security properties, such as 4G EPS-AKA or 5G AKA. An AKA procedure can be used to derive cryptographic keys for use by the UE or network to protect both signaling and user plane data. The AUTN is the network authentication token and may be used by the UE to verify if the network is genuine. The RAND, is a randomly generated value that may be used by UE to calculate a result (RES), which may be sent back to the network to enable the network to verify if the UE is genuine. The network, either 4G or 5G, sends the AUTN and RAND to the UE, in the Authentication Request.

At block 902, the UE may send an Authentication Failure message to the network that includes a Synch Failure as a reason for an Authentication Failure. The Authentication Failure message may generally be sent by the UE to the network (e.g., an MME or AMF) to indicate that authentication of the network has failed. This message can include cause (e.g., a 5GMM cause, or a EMM cause), one of which can be a 'Synch Failure'. The UE declares a Synch Failure when an SQN number that is included in the AUTN is out of an acceptable range.

The AUTN includes, among other things, a MAC and a sequence number (SQN). The MAC may be used by the UE to verify if the network is genuine and the SQN is used by the UE to verify if the authentication vector is a fresh one. The UE retrieves the MAC from the AUTN and also locally calculates the MAC based on certain defined parameters (including RAND). The UE compares the MAC received in the AUTN with the locally calculated expected MAC (XMAC). If both match, the UE considers the network to have passed one of the checks for genuineness. If the MAC verification fails, the UE declares a MAC failure. If the authentication vector generated for one UE is sent to another UE, the MAC check itself will fail. After successful verification of MAC, the UE checks if the SQN value included in the AUTN is in the acceptable range. If the SQN is within the acceptable range, the UE proceeds with the authentication procedure and calculates the necessary keys (e.g., a CK, IK). If the SQN is not in the acceptable range, which indicates that the SQN is not fresh, the UE declares a Synch Failure and sends an Authentication Failure message to the network. The message can be sent with a re-synchronization parameter (AUTS) to enable the network to synchronize the SQN parameter at its end and to send a fresh Authentication Vector with fresh AUTN and RAND.

Each authentication vector that is sent by the network to a UE may be generated uniquely for the UE under consideration. As such, the above sequence of first checking for MAC genuineness and then verifying SQN makes it so that only the UE for which the Authentication Vector (AV) was generated can declare Synch Failure, while other UEs may declare a MAC failure to the same message. An attacker can use this AV to uniquely identify the same UE by repeatedly sending out the stale AV to a group of UEs on a network to elicit response from the unsuspecting UEs. The UE for which the AV was originally generated may continue to respond with a Synch Failure as the reason for the authentication failure, while other UEs will respond with a MAC failure. Thus, the attacker may track one of the UEs on the network using the AUTN and RAND of stale AV.

At block 903, the UE may store the AUTN and the RAND that is associated with the authentication failure. For example, each time the declares a Synch Failure, the UE can store the AUTN and RAND pair in a dedicated data structure, such as, for example, an array with size 'N', or other suitable data structure. As such, the UE can maintain a list of AUTN and RAND pairs that the UE can use as a reference for future received messages.

At block 904, in response to receiving a second authentication request from the network with the AUTN and the RAND, the UE may discard the second Authentication Request. The UE can reference the list of AUTN and RAND pairs to determine if the AUTN and RAND pair in the second Authentication Request has already been received, triggered a Synch Failure, and stored to the list. If so, the UE can discard the message rather than respond with another Authentication Failure message with Synch Failure as the cause. In discarding the second Authentication Request, the UE may also refrain from forwarding the second Authentication Request to a subscriber identity module (SIM) of the UE.

If, however, at block 904, the second Authentication Request includes a second AUTN and a second RAND value that is different from the AUTN and the RAND or not in the list of AUTN and RAND pairs maintained by the UE, then the UE may process the second Authentication Request according to other UE protocol and procedures, for example, as defined in 3GPP TS 24.301 or TS24.501.

Figure 10:
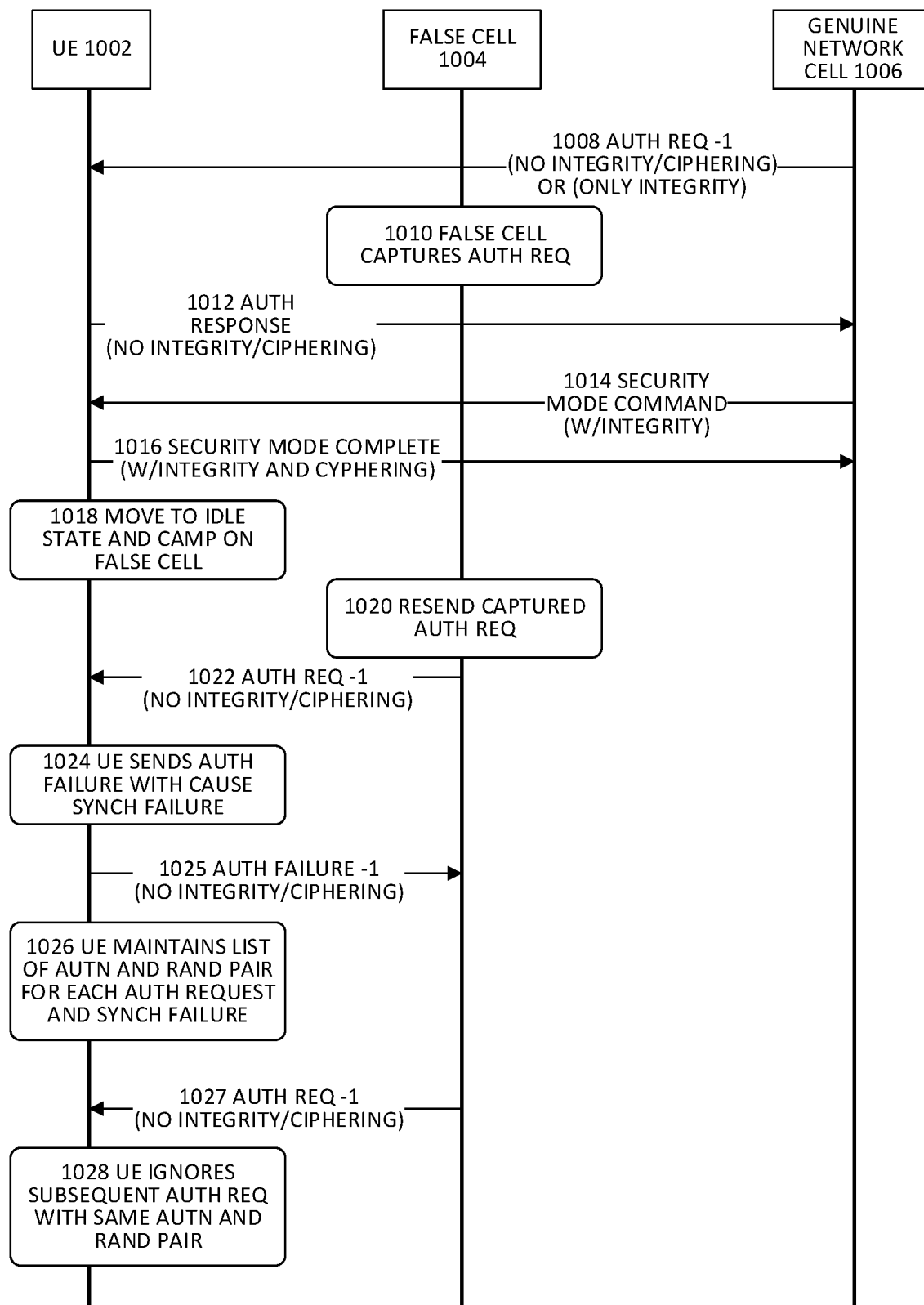
FIG. 10 illustrates an example attack scenario with UE protection against repeated synch failures, according to some aspects.

FIG. 10 illustrates an example attack scenario with UE protection against repeated Synch Failures, according to some aspects. A genuine network cell 1006, a false cell 1004, and a UE 1002 are shown. A genuine cell 1006 may, at operation 1008, send an Authentication Request message to UE 1002. This message may not include integrity protection or ciphering or may be only integrity protected. The false cell 1004 may capture this Authentication Request message at operation 1010. At operation 1012, UE 1002 may send an Authentication Response with no integrity or ciphering. Genuine network cell 1006 can, at operation 1014, send a security mode command with integrity protection. The UE can respond at operation 1016 by sending a security mode complete message with integrity protection and cyphering. At operation 1018, the UE can enter an Idle Mode, such as 5GMM-IDLE-MODE in a 5G environment or a EMM-IDLE-MODE in a 4G environment.

At operation 1020 and 1022, the false cell 1004 can resend the captured Authorization Request to the UE without integrity protection or cyphering. At operation 1024 and 1025, the UE sends an Authentication Failure message to the network (e.g., the fake cell) with cause as Synch Failure. The UE, however, can maintain a list of AUTN and RAND pairs for each Authentication Request message that is sent declaring a Synch Failure. The UE may use this list as a reference for future Authentication Request messages. As such, when, at operation 1027, the false message resends a subsequent Authentication Request message with the same stale AUTN and RAND pair, the UE can ignore this subsequent Authentication Request message, as well as those that occur after it with the same AUTN and RAND pair.

When a UE initially attaches to a network (e.g. turning on the UE), the UE may send its IMSI (International Mobile Subscriber Identity) or SUPI (Subscription Permanent Identifier) to the network for authentication to have itself identified. Once connection is established (e.g., the UE and network are mutually authenticated), the network (MME or AMF) delivers a GUTI value to the UE for use as an ID for re-identification to the network in the future. The network can also allocate a GUTI to a UE during TAU process. That is, the GUTI, the temporary ID that identifies the UE, can be changed into a new value even while the UE stays attached to the network. The network also remembers the GUTI value it allocated to the UE for the network to use to recognize the UE. As such, GUTIs are temporary values that can be changed as needed, and are used as IDs for UEs. In a 4G environment, a GUTI can include an MME identifier (MMEI) that shows which MME allocates the GUTI and an M-TMSI, a temporary value that uniquely identifies a subscriber in that particular MME. The GUTI can also include a Public Land Mobile Network (PLMN) ID. Similarly, in a 5G environment, the GUTI can include a PLMN ID, an AMF ID, and a 5G TMSI.

Some current network and UE behavior may mandate a network to assign a new GUTI to a UE whenever it moves to CONNECTED mode due to paging. This is to ensure privacy protection where a UE is not tracked by an attacker by having previously read the paging message, which is sent in the common channel.

A GUTI re-assignment implies that the S-TMSI to be used for paging changes and hence the identity that will be used in the subsequent paging message would be different from what was used in the current paging message for the UE. Though there is mandate at the network to assign a GUTI, there is no recovery procedure defined either on the UE or on the network side, if the GUTI assignment does not happen or keeps failing. An attacker may leverage the absence of a recovery mechanism for GUTI assignment. For example, the attacker may insert itself between the UE and network. The attacker may selectively drop packets so that an unsuspecting UE does not get standalone GUTI REALLOCATION message and hence continues to reuse the same GUTI/S-TMSI across connections. As such, the UE may be vulnerable to tracking. To protect against such a vulnerability, various solutions are described below which can be used together or separately.

In a mobile network, when a UE does not have any ongoing data transmissions, it may enter an Idle mode in order to preserve battery. If new data arrives for the UE, the network may probe the idle UE by sending a one or more paging messages, to which the idle UE responds to. In this paging procedure, a UE may monitor for the paging message at certain times. The device-specific times, at which the device switches on its receiver and checks for a paging message, are determined by what are called Paging Frame (PF) and Paging Occasion (PO). The PF is a radio frame which may contain one or multiple POs for a set of devices. The PO is the specific time instant where the network can transmit the paging message for a subset of devices corresponding to the same PF. The UE can preserve battery by applying "discontinuous reception" or DRX, meaning that the UE can switch off its receiver at other times. The paging procedure may be controlled by a core network and may be implemented for various mobile networks including 4G, and 5G.

When a UE is in Idle mode, the network does not control UE's movement, rather, the UE automatically selects a new cell as it moves. If UE enters a new location area, based on hearing information from a base station, the UE informs the network of the new tracking area it has entered. The UE does not transmit or receive data in this state, it merely monitors the paging and broadcast channel so as to maintain the connectivity. A UE can be said to be 'camped on' a cell when the UE is in IDLE mode on a cell and is ready to initiate a potential dedicated service or to receive an ongoing broadcast service. A UE may camp on a cell to receive system information for the camped cell, initiate an RRC Connection Establishment on the camped cell, or other reason. The UE may use a service request procedure to change transition from 5GMM-IDLE to 5GMM-CONNECTED mode, where the UE may receive data.

In a 5G environment, a new GUTI can be allocated to a UE through different messaging. For example, the UE can send a Registration Request message with type Initial Registration or type Mobility Registration Update to the network. In response, the network (e.g., AMF) shall send a new 5G-GUTI to the UE in Registration Accept message. A UE can also send a Registration Request message of type Periodic Registration Update to the network. In response, the network should send a new 5G-GUTI to the UE in a Registration Accept message. A UE can also send a Service Request message to the network in response to a network paging message. The network shall respond by using a UE Configuration Update procedure to send a new 5G-GUTI to the UE. The 5G-GUTI reallocation may be part of the registration procedure for mobility registration update. The 5G-GUTI reallocation may be part of the registration procedure for periodic registration update. During the registration procedure for mobility registration update, if the network (e.g., AMF) has not allocated a new 5G-GUTI by the generic UE configuration update procedure, the network may include in the Registration Accept message the new assigned 5G-GUTI. The network can indicate to the UE to initiate a Registration procedure through a RRC connection release message (e.g., with a specified cause) or via a CUC message, and thereby ensure GUTI is re-allocated during the Registration procedure.

Figure 11:
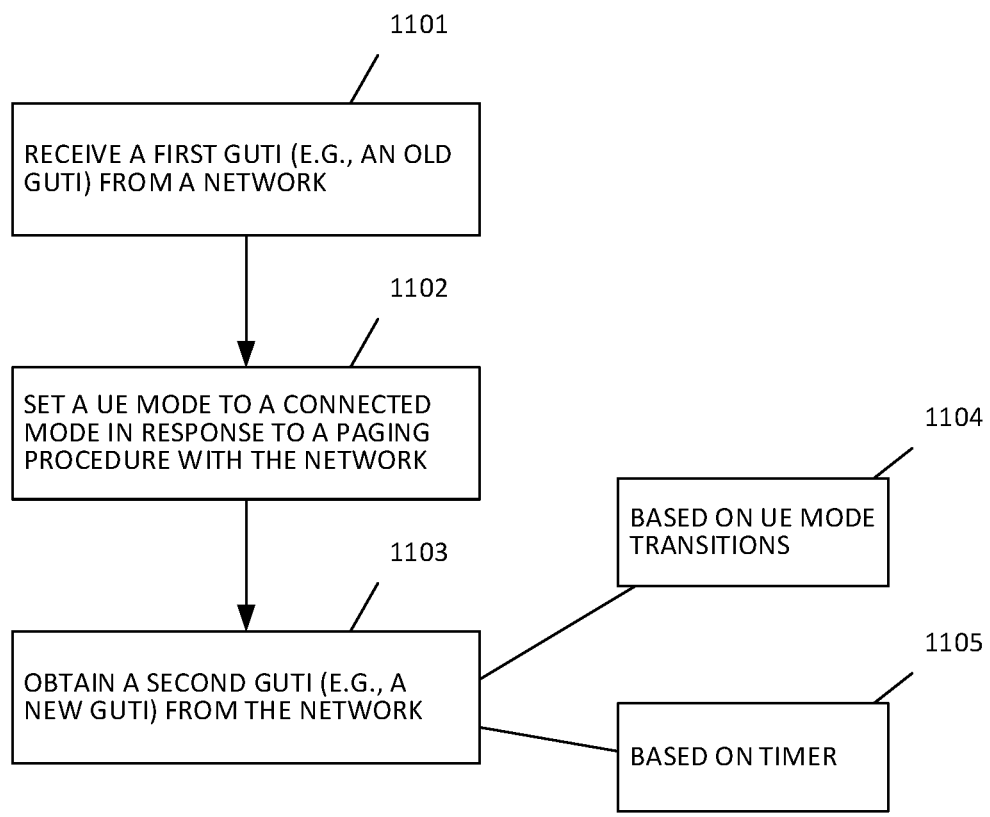
FIG. 11 illustrates a flow diagram for protecting against GUTI reallocation drops performed by a UE, according to some aspects.

FIG. 11 illustrates a flow diagram for a method 1100 for protecting against GUTI reallocation drops performed by a UE, according to some aspects. The method 1100 can be performed by a UE which can also be understood as being performed by a broadband processor of the UE. The method may include messages communicated between a UE and a network that are part of the NAS protocol for EPS or NAS protocol for 5GS.

At block 1101, the UE may receive a first GUTI from a network (e.g., an MME or AMF). The GUTI may be assigned to the UE as described. At block 1102, the UE may set a UE mode to a Connected mode in response to a paging procedure with the network. As described above, the UE, in such a case, should obtain a second GUTI. If, however, the GUTI assignment does not happen or keeps failing, the UE may become vulnerable to an attacker.

At block 1103, the UE may obtain a second GUTI from the network that replaces the first GUTI. Thus, the first GUTI can be understood as the old GUTI, while the second GUTI can be understood as the new GUTI that replaces the old GUTI. The UE can perform operations to obtain the second GUTI even if an attacker interjects itself between the UE and the network to drop GUTI reallocation. The second GUTI can be obtained based on the UE mode transitions at sub-block 1104, or based on one or more timers at sub-block 1105.

For example, at sub-block 1104, obtaining the second GUTI can include triggering, by the UE, a mobility registration procedure to obtain the second GUTI, in response to the UE transitioning to the Connected mode due to the paging procedure and in response to the UE transitioning from the Connected mode to an Idle mode. In such a manner, a UE that moves to connected mode as a response to paging may remember that it is to receive a new GUTI when in the Connected state. If this does not happen and if the UE ends up moving to Idle mode with the old GUTI, then the UE may immediately trigger the mobility registration procedure to obtain the new GUTI.

At sub-block 1105, obtaining the second GUTI may include starting a timer in response to setting the UE mode to the Connected mode (e.g., due to paging). In response to an expiry of the timer, the UE may initiate a mobility registration update with the network to obtain the second GUTI, for example, if the UE has not already had a new GUTI allocated to it. If the new GUTI is obtained when the timer is running, the UE shall stop the timer, no longer requiring the second GUTI.

Additionally, or alternatively, at sub-block 1105, obtaining the second GUTI may include starting a timer in response to each of one or more pages received from the network; and transitioning to a different cell of the same PLMN in response to a number of expirations of the timer exceeding a threshold. The timer may be configured to stop in response to receiving a Configuration Update Command (CUC) message from the network, which would contain a new GUTI. In such a manner, the UE may limit the number of pages it receives from the network while camped on a cell when it does not have allocated to it a new GUTI. If the number of pages exceeds a threshold, the UE can assume this is a false cell and bar the cell. The UE can then camp on another cell of the same PLMN.

Additionally, or alternatively, at sub-block 1105, obtaining the second GUTI may include starting a timer in response to each of one or more pages that are received from the network; and in response to an expiration of the timer, triggering a Registration Request that includes a type mobility (e.g., Mobility Registration Updating) to obtain the second GUTI. The network responds by sending the second GUTI in a Registration Accept message. The timer can be configured to stop in response to receiving a Configuration Update Command message from the network, which would also provide a second GUTI. In such a manner, the UE can act to see that it receives a new GUTI.

Figure 12:
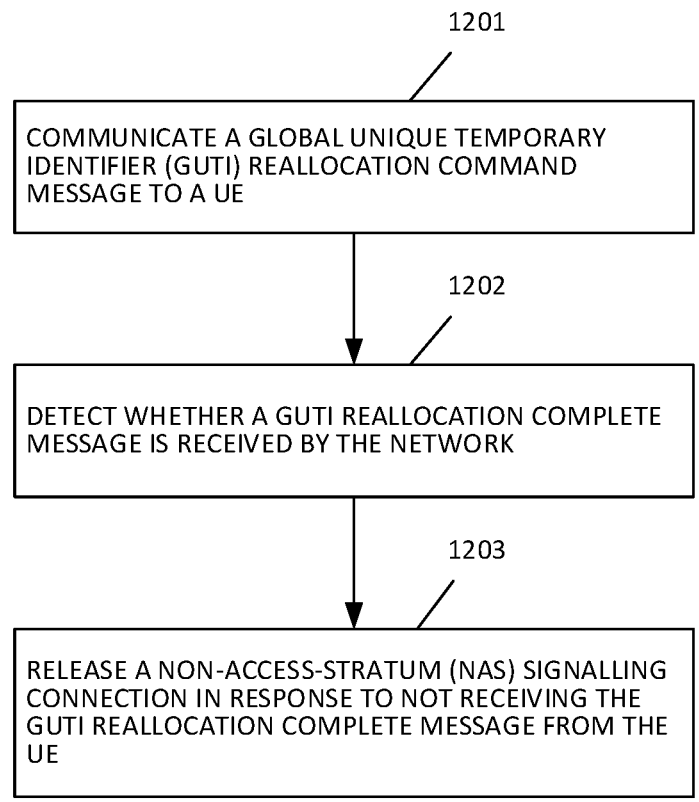
FIG. 12 illustrates a flow diagram for protecting against GUTI reallocation drops performed by a network, according to some aspects.

Additionally, or alternatively to the operations described above, a network may also perform operations to see that the UE receives a new GUTI after paging. FIG. 12 illustrates a flow diagram for a method 1200 protecting against GUTI reallocation drops performed by a network, according to some aspects. The method may include messages communicated between a UE and a network that are part of the NAS protocol for EPS or NAS protocol for 5GS.

At block 1201, a network can communicate a global unique temporary identifier (GUTI) reallocation command message to a UE. The reallocation command can be part of the registration procedure for mobility registration update or for periodic registration update, as described in other sections.

At block 1203, the network can detect whether a GUTI reallocation complete message is received by the network. For example, the network can monitor if the UE acknowledged the GUTI reallocation command or if the UE simply ignored the command and remained in a Connected mode.

At block 1204, the network can release a Non-Access-Stratum (NAS) signalling connection in response to not receiving the GUTI reallocation complete message from the UE, and/or if the UE simply remained in connected mode. In some examples, the releasing the NAS signalling connection includes sending an RRC Connection Release message to the UE with a cause that indicates to the UE to initiate a registration procedure. In some examples, releasing the NAS signalling connection includes sending a Configuration Update Command (CUC) to the UE causing the UE to initiate a registration procedure.

In such a manner, a network whose GUTI Re-allocation is not resulting in a response from the network (GUTI Reallocation Complete) and where the UE continues to stay in Connected state, then the network shall treat the use case as abnormal and release NAS connection with an indication for the UE initiate registration procedure.

Additionally, or alternatively, the network can determine if a plurality of GUTI reallocation failures have occurred. The network can set, as a threshold, a number of consecutive GUTI reallocation failures, and/or a rate of GUTI reallocation failures. In response to the plurality of GUTI reallocation failures satisfying the threshold, the network can send subsequent GUTI reallocation command messages or CUC messages with one or more optional information elements (IEs) included, such that the subsequent GUTI reallocation command message or the CUC message has a varying message size. An Information Element is a group of information which may be included within a signalling message or data flow which is sent across an interface. The variation in message size will make it difficult for an attacker to identify the reallocation command from the genuine network, thus making it difficult for the attacker to drop.

Figure 13:
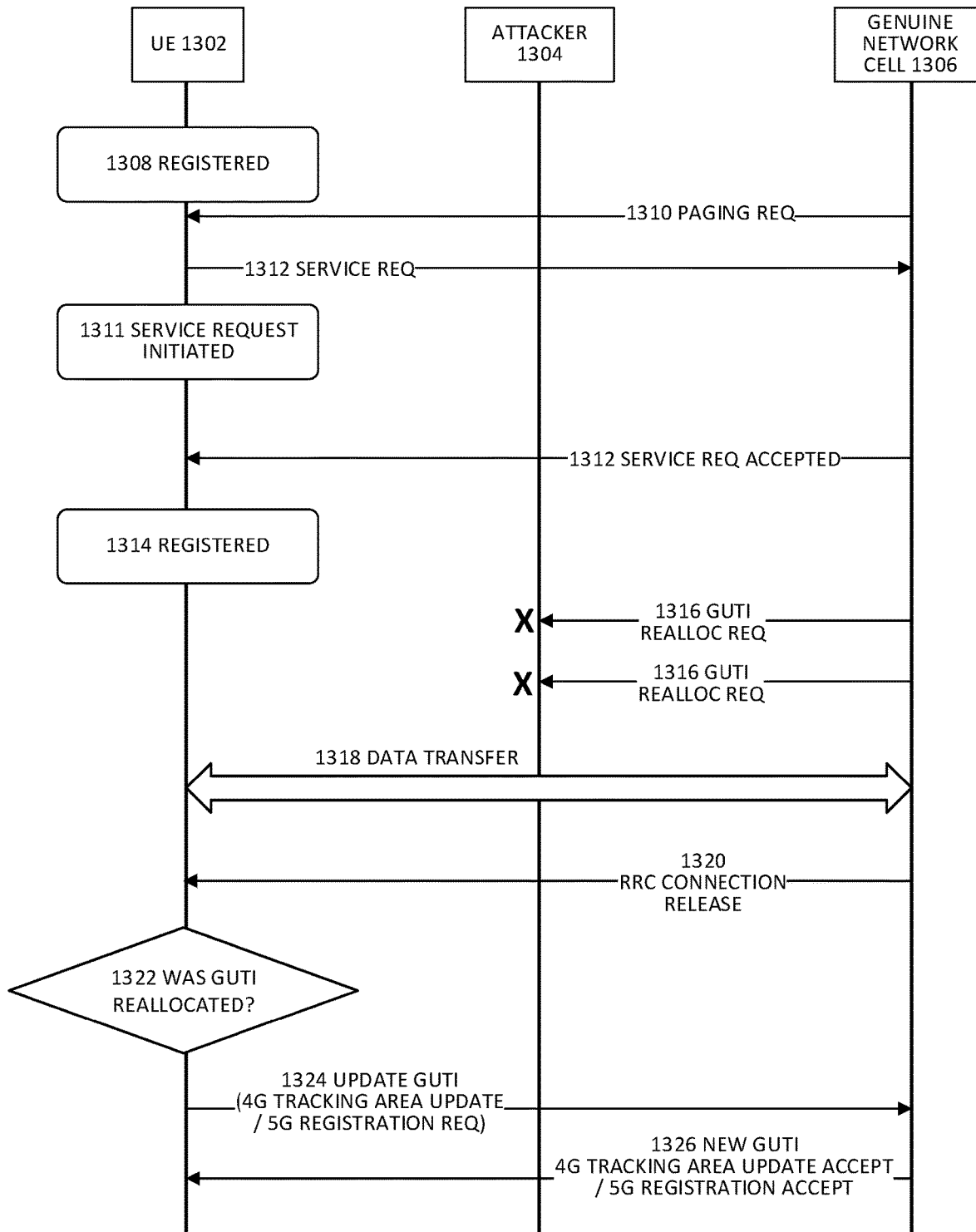
FIG. 13 illustrates an example attack scenario with selective dropping of GUTI reallocation messages, according to some aspects.

FIG. 13 illustrates an example attack scenario with selective dropping of GUTI reallocation messages, according to some aspects.

A UE 1302 has, at operation 1308, a registered state on the network. A genuine network cell 1306 can, at operation 1310, send a paging request to the registered UE. At operation 1312, the UE responds with a service request. At block 1311, the UE transitions to a service request initiated state. At block 1312, the genuine cell 1306 can send a service request accepted message to the UE, thereby causing UE 1302 to transition to a registered state at operation 1314.

At operation 1316, the genuine network cell 1306 may attempt to send a GUTI reallocation request to the UE 1302, however, and attacker 1304 that has interjected itself into the network drops these requests. As such, the UE does not receive these reallocation requests and stays in the connected mode where it can, at operation 1318, perform data transfers with the genuine cell.

As described above, the network can detect that UE is still connected and has not acknowledged the reallocation requests and is still in connected mode. As such, the network can send, at operation 1320, an RRC connection release which can release the NAS signalling connection and also signal to the UE to initiate a Registration procedure through which a new GUTI could be reallocated.

Additionally, or alternatively, the UE can determine, at operation 1322, whether the UE has received a new GUTI, as described above. As such, the UE can, at operation 1324, request an updated GUTI using a tracking area update or a registration request. At block 1326, network can accept the request. As such, the network and/or the UE may take safeguards against an attacker that interjects itself into the network and drops GUTI reallocation messages.

It should be understood that aspects of the present disclosure can be combined by one skilled in the art. For example, non-conflicting aspects described can be combined such that a UE may perform one or more of the operations described. Such combinations may vary depending on application.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

A baseband processor (also known as baseband radio processor, BP, or BBP) is a device (a chip or part of a chip) in a network interface that manages radio functions, such as communicating (e.g., TX and RX) over an antenna.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting", "setting", "obtaining", "communicating", "detecting", "releasing", "discarding", "sending", "determining", "receiving", "forming", "grouping", "aggregating", "generating", "removing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary aspects of the present invention. One skilled in the art will readily recognize from such discussion, the accompanying drawings and the claims that various modifications can be made without departing from the spirit and scope of the invention.

What is claimed is:

1. A baseband processor of a user equipment (UE) configured to perform operations comprising:
    receiving an authentication reject message from a network;
    determining, based on timers T3416, T3418, and T3420 not being running, that an authentication procedure is not ongoing between the UE and the network; and
    in response to the authentication procedure not being ongoing when the authentication reject message is received, discarding the authentication reject message.

2. The baseband processor of the UE according to claim 1, wherein the baseband processor of the UE determines that the authentication procedure is not ongoing in response to when the UE has not sent, prior to receiving the authentication reject message, an authentication response message or an authentication failure message to the network.

3. The baseband processor of the UE according to claim 1, wherein the baseband processor of the UE determines that the authentication procedure is not ongoing in response to a timer T3516 and a timer T3520 not being running.

4. The baseband processor of the UE according to claim 1, further comprising:
   starting, by the baseband processor of the UE, a timer T3247, in response to the authentication reject message not having integrity protection, and the UE having sent an authentication response message or authentication failure message to the network prior to receiving the authentication reject message.

5. The baseband processor of the UE according to claim 1, further comprising, in response to the authentication reject message not having integrity protection, and at least one of a timer T3516 or a timer T3520 being running, starting, by the baseband processor of the UE, a timer T3247.

6. The baseband processor of the UE according to claim 1, further comprising, in response to the authentication reject message not having integrity protection, and at least one of the timers T3416, T3418 or T3420 being running, starting, by the baseband processor of the UE, a timer T3247.

7. The baseband processor of the UE according to claim 1, further comprising:
   in response to determining that the authentication procedure is ongoing between the UE and the network, processing, by the baseband processor of the UE, the authentication reject message.

8. The baseband processor of the UE according to claim 1, wherein the authentication reject message is received as part of a Non-Access-Stratum (NAS) protocol for 5G system (5GS).

9. The baseband processor of the UE according to claim 1, wherein the authentication reject message is received as part of a Non-Access-Stratum (NAS) protocol for Evolved Packet System (EPS).

10. The baseband processor of the UE according to claim 1, further comprising:
    setting a state of the UE as a service request initiated state;
    receiving an authentication request message or an identity request message from the network; and
    discarding the authentication request message or the identity request message, at least in response to the state of the UE being in the service request initiated state.

11. The baseband processor of the UE according to claim 10, wherein the service request initiated state is a 5GMM-Service-Request-Initiated state.

12. The baseband processor of the UE according to claim 10, wherein the service request initiated state is an EMM-Service-Request-Initiated state.

13. The baseband processor of the UE according to claim 10, wherein the authentication request message or the identity request message is discarded by the baseband processor of the UE in response to the state of the UE being in the service request initiated state and the authentication request message or the identity request message not including integrity protection.

14. A method performed by a user equipment (UE) comprising:
    receiving an authentication reject message from a network;
    determining based on timers T3416, T3418, and T3420 not being running, that an authentication procedure is not ongoing between the UE and the network; and
    in response to the authentication procedure not being ongoing when the authentication reject message is received, discarding the authentication reject message.

15. The method according to claim 14, wherein the UE determines that the authentication procedure is not ongoing in response to when the UE has not sent, prior to receiving the authentication reject message, an authentication response message or an authentication failure message to the network.

16. A non-transitory computer readable memory storing instructions that when executed by a user equipment (UE), cause the UE to perform operations comprising:
    receiving an authentication reject message from a network;
    determining based on timers T3416, T3418, and T3420 not being running, that an authentication procedure is not ongoing between the UE and the network; and
    in response to the authentication procedure not being ongoing when the authentication reject message is received, discarding the authentication reject message.

17. The non-transitory computer readable memory according to claim 16, wherein the UE determines that the authentication procedure is not ongoing in response to when the UE has not sent, prior to receiving the authentication reject message, an authentication response message or an authentication failure message to the network.

18. The method according to claim 14, further comprising:
    starting, by the UE, a timer T3247, in response to the authentication reject message not having integrity protection, and the UE having sent an authentication response message or authentication failure message to the network prior to receiving the authentication reject message.

19. The method according to claim 14, further comprising:
    in response to determining that the authentication procedure is ongoing between the UE and the network, processing, by the UE, the authentication reject message.

20. The non-transitory computer readable memory according to claim 16, wherein the operations further comprise:
    starting, by the UE, a timer T3247, in response to the authentication reject message not having integrity protection, and the UE having sent an authentication response message or authentication failure message to the network prior to receiving the authentication reject message.

* * * * *